(12) United States Patent
Görlach

(10) Patent No.: US 7,001,077 B2
(45) Date of Patent: Feb. 21, 2006

(54) BEARING OR DRIVE ASSEMBLY WITH COATED ELEMENTS

(76) Inventor: Bernd Görlach, Klopstockstr. 29, 72770 Reutlingen (DE)

( * ) Notice: Subject to any disclaimer, the term of this patent is extended or adjusted under 35 U.S.C. 154(b) by 152 days.

(21) Appl. No.: 10/701,086

(22) Filed: Nov. 4, 2003

(65) Prior Publication Data

US 2005/0094911 A1    May 5, 2005

(51) Int. Cl.
    *F16C 33/32*    (2006.01)
(52) U.S. Cl. ..................... 384/492; 384/909
(58) Field of Classification Search .............. 384/492, 384/909
    See application file for complete search history.

(56) References Cited

U.S. PATENT DOCUMENTS

| | | | |
|---|---|---|---|
| 3,001,838 A | * | 9/1961 | Lamson et al. .............. 384/910 |
| 3,567,504 A | * | 3/1971 | Hopkins et al. ............. 384/492 |
| 4,293,171 A | | 10/1981 | Kakumoto et al. |
| 4,421,588 A | | 12/1983 | Davies |
| RE32,595 E | | 2/1988 | Davies |
| 4,847,135 A | * | 7/1989 | Braus et al. ................. 384/907 |
| 5,509,738 A | * | 4/1996 | Haynes et al. .............. 384/275 |
| 5,904,426 A | * | 5/1999 | Tsuru et al. ................. 384/462 |
| 6,513,986 B1 | | 2/2003 | Ito et al. |
| 2002/0155304 A1 | * | 10/2002 | Tanaka et al. .............. 384/909 |
| 2003/0134141 A1 | * | 7/2003 | Okado et al. ............... 384/909 |

FOREIGN PATENT DOCUMENTS

| | | |
|---|---|---|
| DE | 2 206 400 | 8/1973 |
| DE | 23 66 046 A | 6/1977 |
| DE | 29 42 265 C2 | 7/1980 |
| DE | 32 38 987 C2 | 6/1983 |
| DE | 36 04 148 A1 | 8/1987 |
| DE | 30 50 056 C1 | 6/1988 |
| DE | 100 64 021 A1 | 7/2001 |
| EP | 1 036 938 A2 | 9/2000 |
| GB | 1 415 100 | 11/1975 |
| GB | 2 034 417 A | 6/1980 |
| GB | 2 075 368 A1 | 11/1981 |
| GB | 2 108 983 A | 5/1983 |
| GB | 2 186 923 A | 8/1987 |

* cited by examiner

*Primary Examiner*—Thomas R. Hannon
(74) *Attorney, Agent, or Firm*—Womble Carlyle Sandridge & Rice, PLLC

(57) ABSTRACT

In a bearing assembly or a gearing with a least two bearing elements or gearing elements that are adapted for movement relative to each other, at least one bearing element or gearing element comprises a polyimide coating on a carrier material.

20 Claims, 1 Drawing Sheet

BEARING OR DRIVE ASSEMBLY WITH COATED ELEMENTS

BACKGROUND OF THE INVENTION

The present invention relates to a bearing or drive assembly with at least two bearing elements or drive elements that are adapted for movement relative to each other.

As a known bearing assembly of the above-described type, a ball bearing comprises a plurality of steel balls that are positioned between an inner ring and an outer ring, and the balls are kept in spaced relationship by a cage. A lubricant reduces friction and wear in the ball bearing and simultaneously protects the bearing elements against corrosion. For special applications, which are expected to function as much as possible without a lubricant, the ball bearing may also include very expensive bearing elements of a ceramic material, of steel coated with carbide in a vacuum, or a solid material of plastic.

BRIEF SUMMARY OF THE INVENTION

One aspect of the present invention is the provision of improvements to a bearing or drive assembly of the type described above. In accordance with one aspect of the present invention, a bearing or drive assembly includes at least two bearing elements or drive elements that are adapted for movement relative to each other, with at least one of the bearing elements or drive elements including a polyimide coating on a carrier material.

The fact that at least one bearing or drive element comprises a polyimide coating on a carrier material permits reducing the lubricant needs and thus the operating costs to a great extent in comparison with lubricated bearing elements of steel. Preferably, a supply of lubricant is no longer required during operation, and production costs are considerably reduced in comparison with ceramic bearing elements, carbide-coated bearing elements, and bearing elements of a solid material of plastic. Since bearing elements of solid plastic material exhibit a very high absorption of water, which may lead to a brittleness of the material, the bearing assembly of the present invention has the additional advantage that the bearing and drive elements with a polyimide coating absorb negligibly little water, i.e., they are hydrolytically stable. Furthermore, the polyimide coating of the present invention facilitates a longer service life of the bearing or drive assembly.

It is possible to utilize the bearing or drive assembly of the present invention in a large variety of technical fields, such as motive power engineering or automobile manufacturing, and in all dimensional ranges, i.e., both in the case of very small dimensions, such as for fine and finest mechanics, and in the case of very large dimensions, such as for windmills. In the case of antifriction bearings, the rings and/or rolling bodies may be coated. The bearing or drive assembly of the invention may also be in the form of a gearing, for example, a toothed gearing, a plain bearing, a linear guideway, for example, with rails adapted for relative movement toward one another, or as a chain drive.

A very thin formation of the polyimide coating is simpler and more cost-favorable to produce, and increases the advantages of hydrolytic stability and longer service life. As protection against corrosion of the carrier material that normally consists for the most part of iron, a passivation coating is applied to the carrier material below the polyimide coating, i.e., chronologically before applying the latter. To the extent that high pressure loads are to be expected in the bearing assembly, a pressure-resistant coating may be additionally applied to the passivated carrier material below and/or inside the polyimide coating.

Preferably, the polyimide coating is prepared from a dissolved prepolymer (prepolymer solution), which is directly obtained from the raw materials or by reversing the polymerization. In a next step, it is preferred to immerse the bearing or drive element into this prepolyimide, so that a thin polyimide film forms. While it is not necessary to add special lubricants in this process, such an addition is possible as an option.

BRIEF DESCRIPTION OF THE DRAWINGS

In the following the invention is described in greater detail with reference to two embodiments illustrated in the drawings, in which.

DETAILED DESCRIPTION OF THE INVENTION

Figure 1:
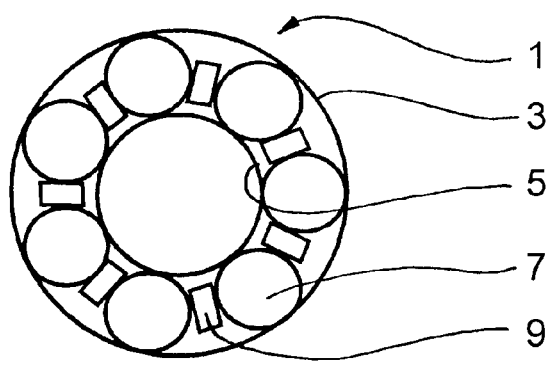
FIG. 1 is a top view of a first embodiment.
Figure 2:
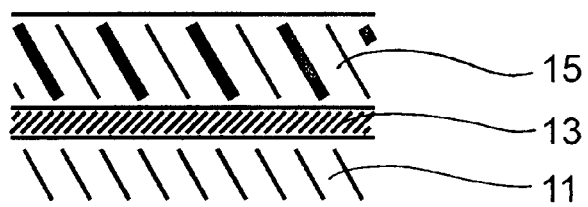
FIG. 2 is a partial cutout view of the first embodiment.
Figure 3:
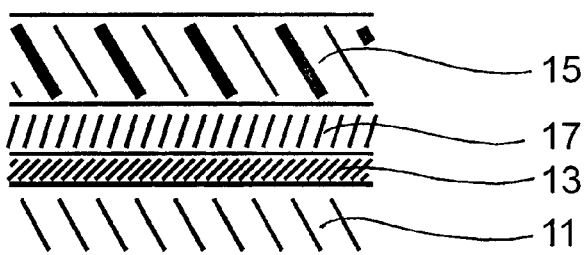
FIG. 3 is a partial cutout view of a second embodiment.

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

In the first embodiment, a bearing assembly 1 is constructed as a ball bearing. Between an outer ring 3 with a larger diameter and an inner ring 5 with a smaller diameter, a plurality of balls 7 are arranged, which are kept in spaced relationship by a ball cage 9. In known manner, the balls 7 abut an inside wall of the outer ring 3 and an outside wall of the inner ring 5. The inside wall of the outer ring 3, the outside wall of the inner ring 5, and preferably also the balls 7 are coated by the following method.

To begin with, a metallic carrier material 11, preferably machinery steel, receives a very thin passivation coating 13, preferably between 0.05 $\mu$m and 5 $\mu$m, to which a polyimide coating 15 is applied. In comparison with the thickness or with other dimensions of the metallic carrier material 11, the polyimide coating is very thin, preferably less than 30 $\mu$m. It is temperature-resistant up to at least 260°–300° C., and absorbs negligibly little water, i.e., it is hydrolytically stable. Its small thickness also prevents peeling under loads. The passivation coating 13 has an even smaller thickness.

For a very simple and cost-favorable production of the aforesaid hybrid coatings, the metal carrier material 11 is initially passivated. Used as raw materials of the polyimide are, for example, a dianhydride, for example, 1,2,4,5 benzenetetracarboxylic 1,4:4,5 dianhydride, and a diamine, for example, 1,5 diamino-5-methylpentane. From these raw materials, a prepolymer of the polyimide is prepared in a solution. The passivated bearing element 3, 5, or 7 that is to be coated is then immersed into this solution, so that a thin film forms. For the polymerization and for removing the solvent, the bearing element 3, 5 or 7 undergoes a subsequent tempering, whereby the final polyimide coating 15 is formed. Before using the bearing assembly 1, a minimal initial lubrication may occur by depositing one drop of a lubricant on the bearing assembly. During its operation, the bearing assembly 1 will need no additional lubricant, i.e., it is permanently lubricated. In a modified variant, the drop of lubricant or an additive having a comparable effect is already added to the prepolymer solution, which will then likewise improve the frictional properties, i.e., the coefficient of sliding friction or friction.

A second embodiment is largely similar to the first embodiment, but is intended for special cases of application. Between the passivation coating 13 and the polyimide coating 15, a pressure-resistant coating 17 is additionally provided, such as, for example, a silicate. Likewise in this second embodiment, the total thickness of the polyimide coating 15, the pressure-resistant coating 17, and the passivation coating 13 is a great deal smaller than the dimensions of the carrier material 11, i.e., the bearing element 3,5, or 7 is again very thinly coated.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A bearing or drive assembly, comprising:
   at least two elements that are adapted for movement relative to each other, wherein:
   the at least two elements are selected from the group consisting of bearing elements and drive elements;
   at least one element of the at least two elements includes a carrier material and a polyimide coating disposed on the carrier material;
   the polyimide coating is very thin in comparison with the carrier material, with the polyimide coating having a thickness of less than 30 µm;
   the polyimide coating is a permanent lubricant, even without other special lubricants being added; and
   the polyimide coating being disposed on the carrier material comprises
   (a) immersing the at least one element into a prepolymer of polyimide so that the carrier material of the at least one element is coated with a film, and
   (b) then polymerizing the film to form the polyimide coating, with the polymerizing of the film including tempering the at least one element.

2. An assembly according to claim 1, wherein the prepolymer of polyimide comprises a prepolymer solution of a dianhydride and a diamine.

3. An assembly according to claim 1, wherein the at least one element further includes a passivation coating that is on the carrier material at a position below the polyimide coating.

4. An assembly according to claim 3, wherein:
   the assembly is a bearing, and
   the at least one element is a ring or a rolling body of the bearing.

5. An assembly according to claim 3, wherein the prepolymer of polyimide comprises a prepolymer solution of a dianhydride and a diamine.

6. An assembly according to claim 3, wherein the at least one element further includes a pressure-resistant coating that is on the passivation coating.

7. An assembly according to claim 6, wherein:
   the assembly is a bearing, and
   the at least one element is a ring or a rolling body of the bearing.

8. An assembly according to claim 6, wherein the pressure-resistant coating is positioned below the polyimide coating.

9. An assembly according to claim 1, wherein:
   the assembly is a bearing, and
   the at least one element is a ring or a rolling body of the bearing.

10. An assembly according to claim 9, wherein the prepolymer of polyimide comprises a prepolymer solution of a dianhydride and a diamine.

11. An assembly according to claim 9, wherein the at least one element further includes a passivation coating that is on the carrier material at a position below the polyimide coating.

12. An assembly according to claim 11, wherein the at least one element further includes a pressure-resistant coating that is on the passivation coating.

13. An assembly according to claim 12, wherein the pressure-resistant coating is positioned below the polyimide coating.

14. An assembly according to claim 1, wherein the prepolymer of polyimide comprises a solution that includes an additive for improving frictional properties of the polyimide coating.

15. An assembly according to claim 14, wherein:
   the assembly is a bearing, and
   the at least one element is a ring or a rolling body of the bearing.

16. An assembly according to claim 14, wherein the additive includes a lubricant.

17. An assembly according to claim 16, wherein:
   the assembly is a bearing, and
   the at least one element is a ring or a rolling body of the bearing.

18. An assembly according to claim 14, further comprising a passivation coating on the carrier material at a position below the polyimide coating.

19. An assembly according to claim 18, further comprising a pressure-resistant coating on the passivation coating.

20. An assembly according to claim 19, wherein the pressure-resistant coating is positioned below the polyimide coating.

* * * * *